(12) United States Patent
Sone et al.

(10) Patent No.: US 12,305,439 B2
(45) Date of Patent: May 20, 2025

(54) NOTIFICATION DEVICE, NOTIFICATION METHOD, AND NON-TRANSITORY STORAGE MEDIUM

(71) Applicant: TOYOTA JIDOSHA KABUSHIKI KAISHA, Toyota (JP)

(72) Inventors: Ryohei Sone, Anjo (JP); Shinichi Hagihara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 22 days.

(21) Appl. No.: 18/383,220

(22) Filed: Oct. 24, 2023

(65) Prior Publication Data

US 2024/0200385 A1    Jun. 20, 2024

(30) Foreign Application Priority Data

Dec. 19, 2022   (JP) ................. 2022-202619

(51) Int. Cl.
*E05F 15/40*     (2015.01)
*B60Q 9/00*      (2006.01)

(52) U.S. Cl.
CPC ........... *E05F 15/40* (2015.01); *B60Q 9/008* (2013.01); *E05Y 2400/53* (2013.01); *E05Y 2400/812* (2013.01); *E05Y 2900/531* (2013.01)

(58) Field of Classification Search
None
See application file for complete search history.

(56) References Cited

U.S. PATENT DOCUMENTS

| 5,165,108 | A | * | 11/1992 | Asayama | G01S 11/12 340/901 |
| 5,627,510 | A | * | 5/1997 | Yuan | B60Q 9/008 340/435 |
| 6,339,369 | B1 | * | 1/2002 | Paranjpe | B60Q 9/008 340/904 |
| 6,590,495 | B1 | * | 7/2003 | Behbehani | G01S 13/931 340/904 |
| 10,023,204 | B1 | * | 7/2018 | Kim | B60Q 9/008 |
| 10,696,224 | B2 | * | 6/2020 | Ho | G06F 3/013 |
| 11,268,315 | B2 | * | 3/2022 | Kothari | B60Q 9/00 |
| 2002/0030591 | A1 | * | 3/2002 | Paranjpe | B60Q 9/008 340/436 |
| 2004/0167718 | A1 | * | 8/2004 | Hoenes | G01S 15/87 340/903 |
| 2010/0328644 | A1 | * | 12/2010 | Lu | H04N 23/57 356/5.01 |
| 2012/0013485 | A1 | * | 1/2012 | Pampus | B60W 50/14 340/932.2 |

(Continued)

FOREIGN PATENT DOCUMENTS

JP     2003-104055 A    4/2003

*Primary Examiner* — Muhammad Adnan
(74) *Attorney, Agent, or Firm* — Oliff PLC

(57) ABSTRACT

A notification device includes a memory and a processor coupled to the memory. The processor is configured to acquire a distance between a door provided at a vehicle and an obstacle facing the door, and, in a case in which the distance is equal to or less than a reference threshold value determined in advance by an occupant of the vehicle, and a condition determined in advance by the occupant is satisfied, provide notification of the distance to the occupant by a method determined in advance by the occupant.

7 Claims, 5 Drawing Sheets

(56) References Cited

U.S. PATENT DOCUMENTS

| | | | |
|---|---|---|---|
| 2013/0234844 A1* | 9/2013 | Yopp | B60Q 9/008 |
| | | | 340/435 |
| 2014/0204212 A1* | 7/2014 | Pawlicki | B60W 30/143 |
| | | | 348/148 |
| 2014/0257630 A1* | 9/2014 | Ruiz | E05B 77/54 |
| | | | 701/36 |
| 2015/0298611 A1* | 10/2015 | Komoguchi | B60Q 9/008 |
| | | | 340/435 |
| 2016/0208537 A1* | 7/2016 | Senguttuvan | B60Q 9/00 |
| 2017/0011602 A1* | 1/2017 | Brav | H04W 4/80 |
| 2019/0071013 A1* | 3/2019 | Adam | B60W 50/16 |
| 2019/0179320 A1* | 6/2019 | Pacala | G01C 21/30 |
| 2019/0368236 A1* | 12/2019 | Sakakura | H04N 7/18 |
| 2020/0023834 A1* | 1/2020 | Gowda | G05D 1/0257 |
| 2020/0198632 A1* | 6/2020 | Yata | B60R 21/00 |
| 2020/0317218 A1* | 10/2020 | Mao | B60K 31/18 |
| 2022/0144296 A1* | 5/2022 | Seitz | B60K 35/85 |

* cited by examiner

NOTIFICATION DEVICE, NOTIFICATION METHOD, AND NON-TRANSITORY STORAGE MEDIUM

CROSS-REFERENCE TO RELATED APPLICATION

This application is based on and claims priority under 35 USC 119 from Japanese Patent Application No. 2022-202619 filed on Dec. 19, 2022, the disclosure of which is incorporated by reference herein.

BACKGROUND

Technical Field

The present disclosure relates to a notification device, a notification method, and a non-transitory storage medium.

Related Art

For example, Japanese Patent Application Laid-Open (JP-A) No. 2003-104055 discloses a vehicle door opening assistance device. The vehicle door opening assistance device includes an obstacle position acquisition means that acquires a position of an obstacle in a region facing a door of a vehicle body based on a detection signal from a distance sensor attached to the vehicle body, a possible opening angle calculation means that calculates a possible opening angle of the door from the position of the obstacle, an opening angle acquisition means that acquires an opening angle of the door, and a presentation means that presents a relationship between the possible opening angle and the opening angle.

In the vehicle door opening assistance device disclosed in JP-A No. 2003-104055, there is a possibility that an occupant may not be able to set a threshold value for a distance between the door of the vehicle body and the obstacle, a condition for determining whether or not to provide notification of the distance to the occupant, and method of providing notification to the occupant.

SUMMARY

The present disclosure provides a notification device, a notification method, and a non-transitory storage medium that enable an occupant to set a threshold value for a distance between a door of a vehicle and an obstacle, a condition for determining whether or not to provide notification of the distance to the occupant, and a notification method for providing notification to the occupant.

A notification device according to a first aspect includes: an acquisition section configured to acquire a distance between a door provided at a vehicle and an obstacle facing the door; and a notification section configured to, in a case in which the distance is equal to or less than a reference threshold value determined in advance by an occupant of the vehicle, and a condition determined in advance by the occupant is satisfied, provide notification of the distance to the occupant by a method determined in advance by the occupant.

In the notification device according to the first aspect, the acquisition section acquires the distance between the door provided at the vehicle and the obstacle facing the door, and, in a case in which the distance is equal to or less than the reference threshold value determined in advance by the occupant of the vehicle and in which the condition determined in advance by the occupant is satisfied, the notification section provides notification of the distance to the occupant by the method determined in advance by the occupant. According to the notification device according to the first aspect, the occupant can set the threshold value for the distance between the door of the vehicle and the obstacle, the condition for determining whether or not to provide notification of the distance to the occupant, and the notification method for providing notification to the occupant.

A notification device according to a second aspect is the notification device according to the first aspect, wherein the notification section is configured to provide notification of the distance in a case in which the vehicle is stopped and the door is closed.

According to the notification device according to the second aspect, the occupant can grasp the distance between the door and the obstacle before opening the door.

A notification device according to a third aspect is the notification device according to the first aspect or the second aspect, wherein the notification section is configured to provide notification of the distance at a larger volume as the distance becomes shorter, in a case in which the vehicle is stopped and the door is open.

The notification device according to the third aspect can call attention to the possibility that the door may be caused to hit the obstacle.

A notification device according to a fourth aspect is the notification device according to any one of the first aspect to the third aspect, wherein the acquisition section is configured to acquire a seating position of the occupant, and the notification section is configured to change the reference threshold value according to the seating position of the occupant.

According to the notification device according to the fourth aspect, the reference threshold value can be changed according to the seating position of the occupant.

A notification device according to a fifth aspect is the notification device according to any one of the first aspect to the fourth aspect, further including a control section configured to perform control so as to disable opening and closing of the door, in a case in which the distance is equal to or less than a restriction threshold value that is less than the reference threshold value.

The notification device according to the fifth aspect can prevent the door from being caused to hit the obstacle.

According to the present disclosure, the occupant can set the threshold value for the distance between the door of the vehicle and the obstacle, the condition for determining whether or not to provide notification of the distance to the occupant, and the notification method for providing notification to the occupant.

BRIEF DESCRIPTION OF THE DRAWINGS

An Exemplary embodiment of the present invention will be described in detail based on the following figures, wherein.

DETAILED DESCRIPTION

Figure 1:
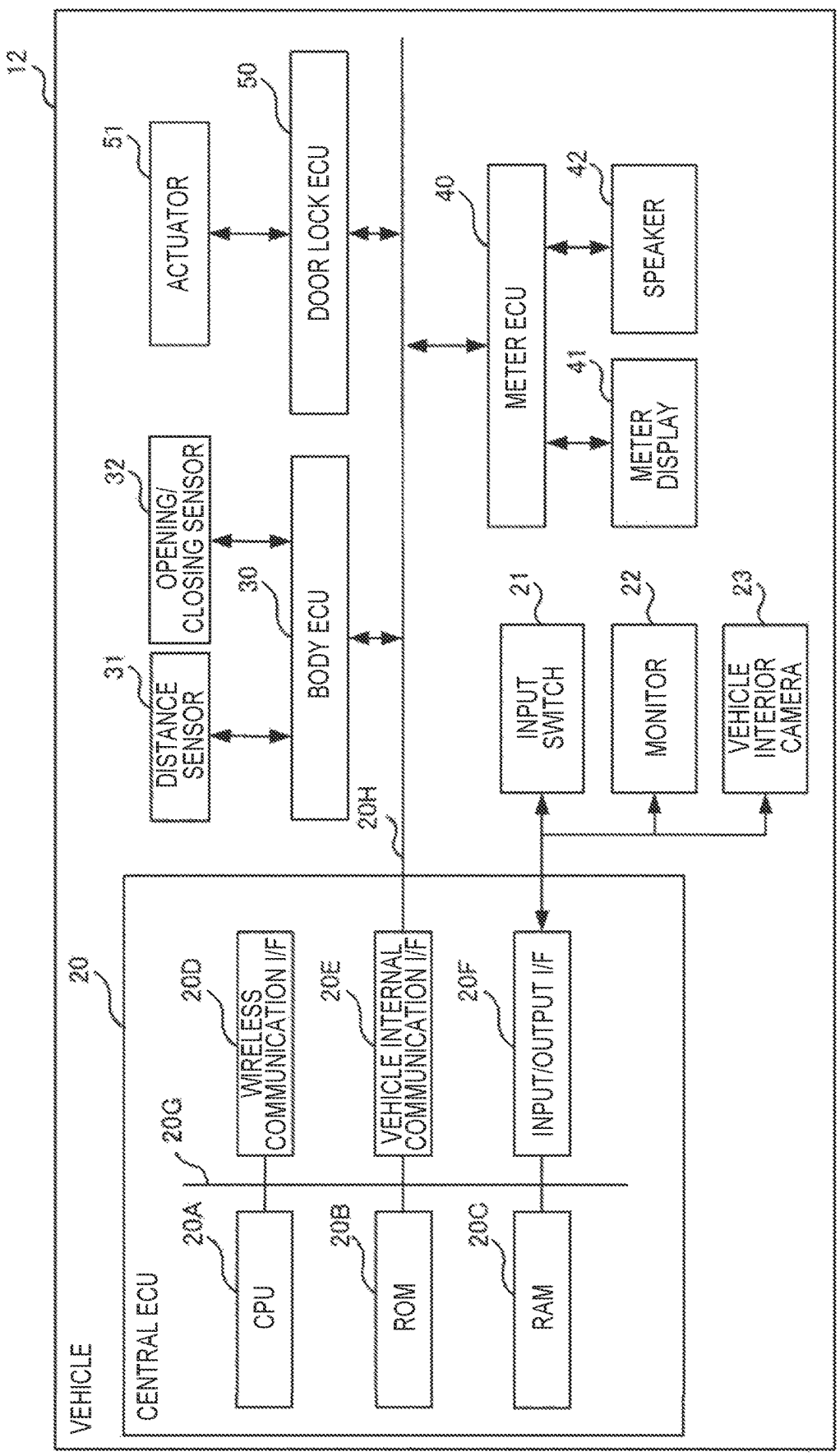
FIG. 1 is a block diagram illustrating a hardware configuration of equipment that is installed at a vehicle according to an exemplary embodiment.

As illustrated in FIG. 1, a vehicle 12 according to the present exemplary embodiment is configured to include a central electronic control unit (ECU) 20 serving as a notification device, a body ECU 30, a meter ECU 40, and a door lock ECU 50.

The body ECU 30 transmits, to the central ECU 20, a sensor value relating to a distance between a door provided at the vehicle 12 (hereafter referred to as the "door") and an obstacle facing the door (hereafter referred to as the "obstacle"). The obstacle is, for example, a vehicle, a person, a column, a guard rail or the like that is adjacent to the vehicle 12.

Further, in the present exemplary embodiment, the aforementioned sensor value is measured by distance sensors 31 respectively provided at plural doors provided at the vehicle 12. Furthermore, the body ECU 30 transmits an opening/closing signal indicating whether or not the door has been opened or closed, to the central ECU 20. In the present exemplary embodiment, an opening/closing sensor 32 provided at the door detects whether or not the door has been opened or closed.

Upon receiving an instruction from the central ECU 20, the meter ECU 40 displays, on a meter display 41, the distance between the door and the obstacle (hereafter also referred to as the "distance"). The meter display 41 is a liquid crystal monitor provided at a meter panel. Further, upon receiving an instruction from the central ECU 20, the meter ECU 40 provides notification of the distance to an occupant via a speaker 42.

When a lock signal is input from the central ECU 20, the door lock ECU 50 outputs a drive signal to an actuator 51 of a door lock mechanism to lock the door.

As illustrated in FIG. 1, the central ECU 20 is configured to include a central processing unit (CPU) 20A, a read only memory (ROM) 20B, a random access memory (RAM) 20C, a wireless communication interface (I/F) 20D, a vehicle internal communication I/F 20E, and an input/output I/F 20F. The CPU 20A, the ROM 20B, the RAM 20C, the wireless communication I/F 20D, the vehicle internal communication I/F 20E, and the input/output I/F 20F are connected so as to be capable of communicating with each other via an internal bus 20G.

The CPU 20A is a central arithmetic processing unit, and the CPU 20A executes various programs and controls various sections. Namely, the CPU 20A serving as a processor reads a program from the ROM 20B serving as a memory, and executes the program using the RAM 20C as a workspace. The ROM 20B according to the present exemplary embodiment stores a notification program. The notification program is a program for controlling the central ECU 20.

The ROM 20B stores various programs and various data. The RAM 20C serves as a workspace to temporarily store programs and data.

The wireless communication I/F 20D is an interface for communicating with equipment other than the vehicle 12, and, for example, employs a standard such as Ethernet (registered trademark), FDDI, Wi-Fi (registered trademark), or the like.

The vehicle internal communication I/F 20E is an interface for connecting with the body ECU 30, the meter ECU 40, and the door lock ECU 50. This interface employs a communication standard according to the controller area network (CAN) protocol. The vehicle internal communication I/F 20E is connected to an external bus 20H.

The input/output I/F 20F is an interface for connecting with an input switch 21, a monitor 22, and a vehicle interior camera 23.

The input switch 21 is configured as a touch panel that also serves as a monitor 22. It should be noted that the input switch 21 is provided at an instrument panel, a center console, a steering wheel, or the like, and may be a switch at which operation is input using an occupant's fingers. The input switch 21 in this case may employ, for example, a push-button numeric key pad, a touch pad, or the like.

The monitor 22 is a liquid crystal monitor provided at the instrument panel or the like. As described above, the monitor 22 is provided as a touch panel that also serves as the input switch 21.

The vehicle interior camera 23 is a camera that photographs an interior of the vehicle 12.

Figure 2:
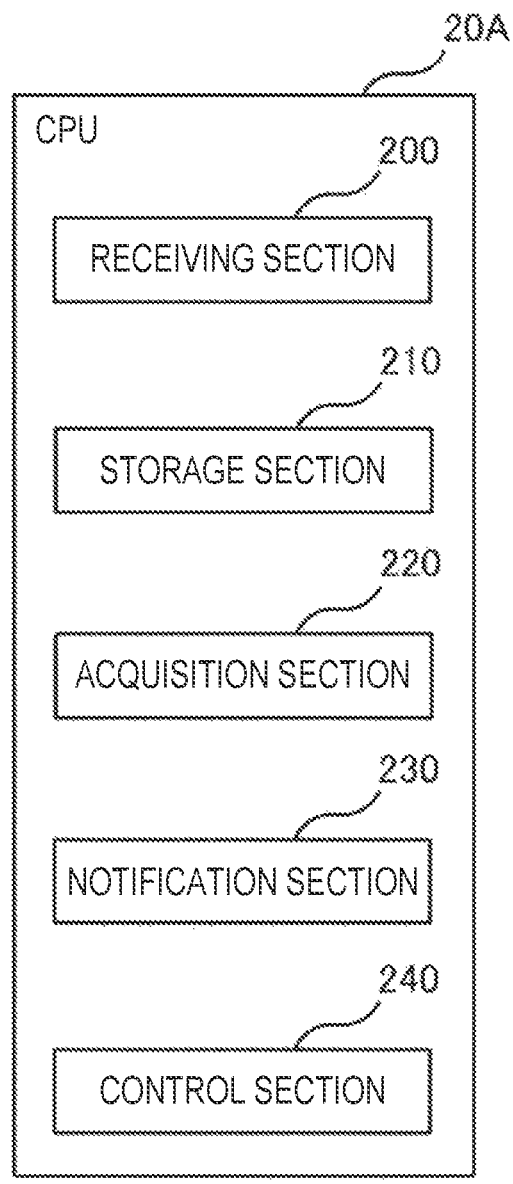
FIG. 2 is a block diagram illustrating an example of a functional configuration of a CPU in a central ECU according to the exemplary embodiment.

FIG. 2 is a block diagram illustrating an example of a functional configuration of the CPU 20A. As illustrated in FIG. 2, the CPU 20A includes a receiving section 200, a storage section 210, an acquisition section 220, a notification section 230, and a control section 240. The respective functional configuration is implemented by the CPU 20A reading and executing a notification program stored in the ROM 20B.

The receiving section 200 receives a reference threshold value determined in advance by an occupant of the vehicle 12 (hereafter referred to as the "occupant"). The reference threshold value is a threshold value of a distance for determining whether or not the notification section 230, which will be described later, provides notification of the distance between the door and the obstacle. The receiving section 200 may receive different reference threshold values for each door, or may receive a single reference threshold value.

Further, the receiving section 200 receives a set occupant determined in advance by the occupant. The set occupant is any occupant who is particularly wished to be warned. The set occupant is, for example, a child. The receiving section 200 may receive only one set occupant, or may receive plural set occupants.

Further, the receiving section 200 receives a set condition determined in advance by the occupant. The set condition is a condition for determining whether or not the notification section 230 provides notification of the distance. In the present exemplary embodiment, a condition that the vehicle 12 is stopped and that the door is closed, or a condition that the vehicle 12 is stopped and that the door is open, is applied as the set condition. However, there is no limitation to this example. For example, a condition that the obstacle is a vehicle other than the vehicle 12, a condition that the obstacle is a person, or the like may be applied as the set condition.

Further, the receiving section 200 receives a notification method determined in advance by the occupant. The notification method is a method by which the notification section 230 provides notification of the distance. In the present exemplary embodiment, a voice notification method via the speaker 42 (hereafter referred to as the "voice notification method") or a display notification method via the meter display 41 (hereafter referred to as the "display notification method") is applied as the notification method. However, there is no limitation to this example. For example, a display notification method via the monitor 22, a voice or display notification method via a smartphone or the like that is possessed by the occupant, or the like may be applied as the notification method.

The receiving section 200 receives the reference threshold value, the set occupant, the set condition, and the notification method from the occupant via the input switch 21. However, there is no limitation to this example. For example, the receiving section 200 may receive the reference threshold value, the set occupant, the set condition, and the notification method from a smartphone or the like possessed by the occupant, via the wireless communication I/F 20D.

The storage section 210 stores the reference threshold value, the set occupant, the set condition, and the notification method received by the receiving section 200, in the ROM 20B. It should be noted that, in a case in which the central ECU 20 includes a storage serving as the memory, the storage section 210 may store the reference threshold value, the set occupant, the set condition, and the notification method in the storage.

The acquisition section 220 has a function of acquiring the distance. More specifically, the acquisition section 220 acquires the distance measured by the distance sensor 31 for each door, via the body ECU 30. Further, the acquisition section 220 has a function of further acquiring a seating position of the occupant. More specifically, the acquisition section 220 acquires the seating position of the occupant from the interior of the vehicle 12 that has been photographed by the vehicle interior camera 23.

The notification section 230 has a function of providing notification of the distance to the occupant by the notification method in a case in which the distance is equal to or less than the reference threshold value and in which the set condition is satisfied.

In the present exemplary embodiment, in a case in which the set condition is the condition that the vehicle 12 is stopped and that the door is closed, the notification section 230 provides notification of the distance in a case in which the vehicle 12 is stopped and the door is closed. On the other hand, in a case in which the set condition is the condition described above, the notification section 230 does not provide notification of the distance in a case in which the door is open. Further, in the present exemplary embodiment, in a case in which the set condition is the condition that the vehicle 12 is stopped and that the door is open, the notification section 230 provides notification of the distance in a case in which the vehicle 12 is stopped and the door is open. On the other hand, in a case in which the set condition is the condition described above, the notification section 230 does not provide notification of the distance in a case in which the door is closed. In other words, in a case in which an actual state of the vehicle 12 satisfies the set condition, the notification section 230 provides notification of the distance. On the other hand, in a case in which the actual state of the vehicle 12 does not satisfy the set condition, the notification section 230 does not provide notification of the distance.

Further, in the present exemplary embodiment, in a case in which the notification method is the display notification method, the notification section 230 provides notification of the distance by display via the meter display 41. On the other hand, in a case in which the notification method is the voice notification method, the notification section 230 provides notification of the distance by voice via the speaker 42. Further, in a case in which the set condition is the condition that the vehicle 12 is stopped and that the door is open and in which the notification method is the voice notification method, the notification section 230 provides notification of the distance at a larger volume as the distance becomes shorter. In the present exemplary embodiment, the volume is set in two stages. However, there is no limitation to this example. The volume may be set in three or more stages. Further, the notification section 230 may provide notification of the distance at a smaller volume as the distance becomes shorter.

Further, the notification section 230 has a function of changing the reference threshold value according to the seating position of the occupant. In the present exemplary embodiment, in a case in which the distance between a door closest to the set occupant and the obstacle is equal to or less than an enlarged threshold value that is larger than the reference threshold value, the notification section 230 provides notification of this distance to the occupant. In the present exemplary embodiment, the enlarged threshold value is of one type. However, there is no limitation to this example. Two or more types of enlarged threshold values may be used. Further, the enlarged threshold value may be received by the receiving section 200 from the occupant, or may be set by the notification section 230.

It should be noted that the notification section 230 may have a function of further providing notification of a parking method of the vehicle 12 so that the distance is equal to or less than the reference threshold value.

The control section 240 has a function of performing control so as to disable opening and closing of a door, in a case in which the distance is equal to or less than a restriction threshold value. The restriction threshold value is a value that is less than the reference threshold value. The restriction threshold value may be received by the receiving section 200 from the occupant, or may be set by the control section 240. More specifically, the control section 240 outputs, to the door lock ECU 50, a locking signal corresponding to the door for which the distance is equal to or less than the restriction threshold value. Then, the actuator 51 of the door lock mechanism corresponding to the door for which the distance is equal to or less than the restriction threshold value is controlled so as to be driven and controlled. The door for which the distance is equal to or less than the restriction threshold value is then locked. The door that has been locked in this manner cannot be opened or closed unless the control section 240 outputs an unlocking signal to the door lock ECU 50.

It should be noted that the control section 240 may determine a door that can be opened and closed, according to the seating position of the occupant. More specifically, in a case in which the distance between the door closest to the set occupant and the obstacle is less than the enlarged threshold value, the control section 240 may perform control so as to disable opening and closing of this closest door. Further, the control section 240 may control doors other than the door closest to the set occupant as doors that are openable and closable, regardless of the distance.

Flow of Control

A flow of processing executed in the present exemplary embodiment will be explained, with reference to the flowcharts of FIG. 3 and FIG. 4.

First, a flow of receiving processing in which the reference threshold value, the set occupant, the set condition, and the notification method are received from the occupant will be explained, with reference to FIG. 3. The receiving processing is carried out by the CPU 20A reading a notification processing program from the ROM 20B, and decompressing and executing the notification processing program in the RAM 20C.

Figure 3:
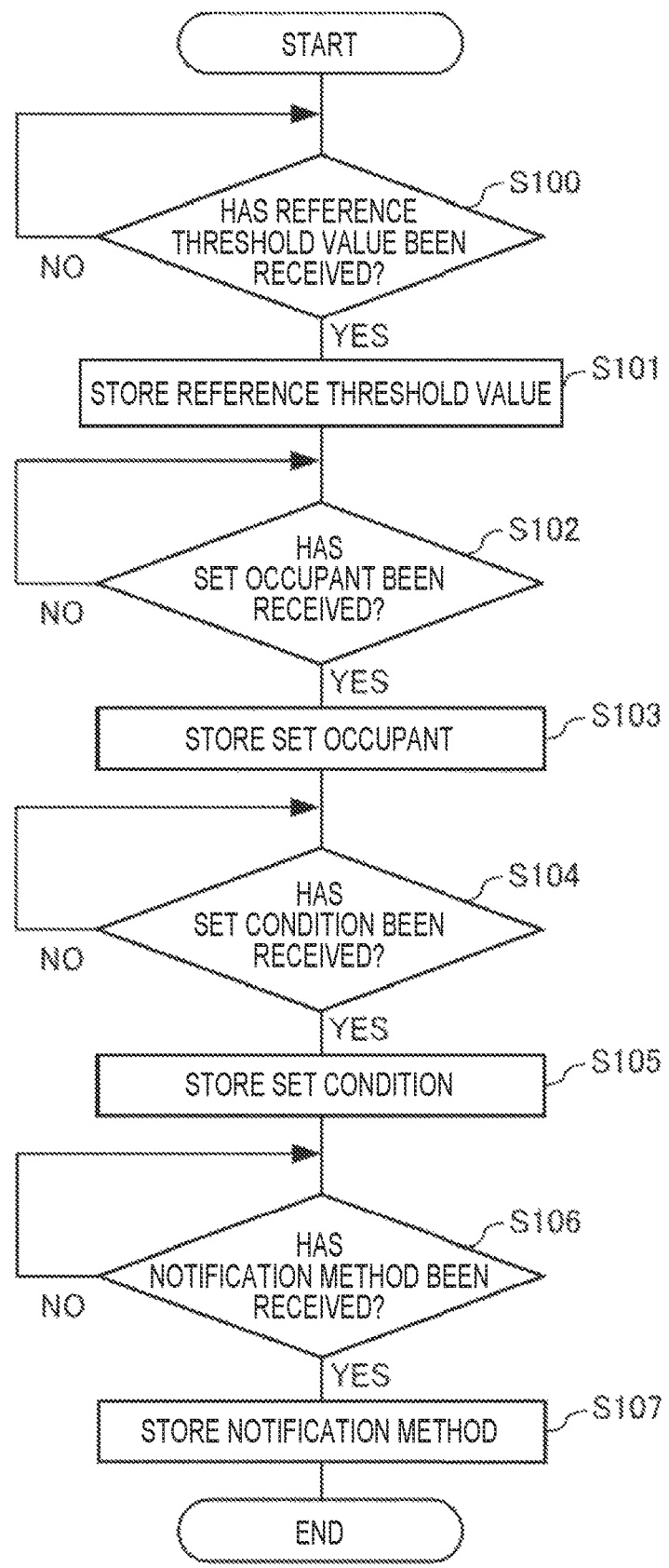
FIG. 3 is a flowchart illustrating an example of a flow of receiving processing according to the exemplary embodiment.

At step S100 in FIG. 3, the CPU 20A waits until the reference threshold value is received from the occupant via the input switch 21. Upon receiving the reference threshold value (step S100: YES), the CPU 20A transitions to step S101.

At step S101, the CPU 20A causes the reference threshold value received at step S100 to be stored in the ROM 20B.

At step S102, the CPU 20A waits until the set occupant is received from the occupant via the input switch 21. Upon receiving the set occupant (step S102: YES), the CPU 20A transitions to step S103.

At step S103, the CPU 20A causes the set occupant received at step S102 to be stored in the ROM 20B.

At step S104, the CPU 20A waits until the set condition is received from the occupant via the input switch 21. Upon receiving the set condition (step S104: YES), the CPU 20A transitions to step S105.

At step S105, the CPU 20A causes the set condition received at step S104 to be stored in the ROM 20B.

At step S106, the CPU 20A waits until the notification method is received from the occupant via the input switch 21. Upon receiving the notification method (step S106: YES), the CPU 20A transitions to step S107.

At step S107, the CPU 20A causes the notification method received at step S106 to be stored in the ROM 20B, and ends the present receiving processing.

Next, a flow of notification processing in which notification of the distance is provided to the occupant will be explained, with reference to FIG. 4. The notification processing is carried out by the CPU 20A reading the notification processing program from the ROM 20B, and decompressing and executing the notification processing program in the RAM 20C. It should be noted that, in the example illustrated in FIG. 4, a case in which the reference threshold value, the set occupant, the set condition, and the notification method are stored in the ROM 20B in advance by execution of the receiving processing is explained.

Figure 4:
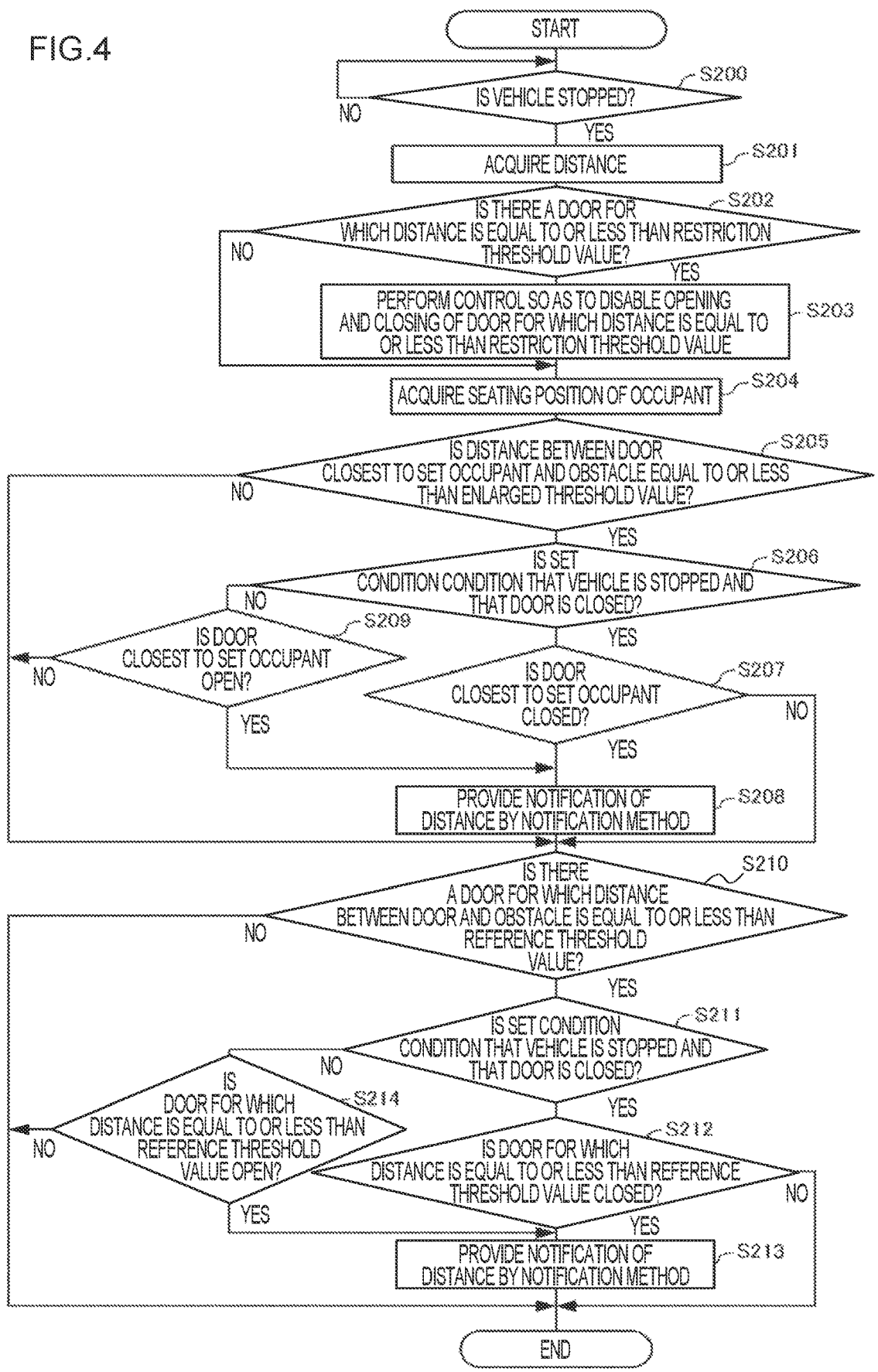
FIG. 4 is a flowchart illustrating an example of a flow of notification processing according to the exemplary embodiment.

At step S200 in FIG. 4, the CPU 20A determines whether or not the vehicle 12 is stopped. More specifically, the CPU 20A determines that the vehicle 12 is stopped in a case in which a vehicle speed acquired from a vehicle speed sensor provided at the vehicle 12 is 0 km per hour.

At step S201, the CPU 20A acquires the distance. More specifically, the acquisition section 220 acquires the distance measured by the distance sensor 31 for each door, via the body ECU 30.

At step S202, the CPU 20A determines whether or not there is a door for which the distance is equal to or less than the restriction threshold value. In a case in which there is a door for which the distance is equal to or less than the restriction threshold value (step S202: YES), the CPU 20A transitions to step S203. On the other hand, in a case in which there is no door for which the distance is equal to or less than the restriction threshold value (step S202: NO), the CPU 20A transitions to step S204.

At step S203, the CPU 20A performs control so as to disable opening and closing of the door, in a case in which the distance is equal to or less than the restriction threshold value. More specifically, the CPU 20A outputs, to the door lock ECU 50, a locking signal corresponding to the door for which the distance is equal to or less than the restriction threshold value.

At step S204, the CPU 20A acquires the seating position of the occupant. More specifically, the CPU 20A acquires the seating position of the occupant from the interior of the vehicle 12 photographed by the vehicle interior camera 23.

At step S205, the CPU 20A determines whether or not the distance between the door closest to the set occupant and the obstacle is equal to or less than the enlarged threshold value. In a case in which the distance between the door closest to the set occupant and the obstacle is equal to or less than the enlarged threshold value (step S205: YES), the CPU 20A transitions to step S206. On the other hand, in a case in which the distance between the door closest to the set occupant and the obstacle is larger than the enlarged threshold value (step S205: NO), the CPU 20A transitions to step S210.

At step S206, the CPU 20A determines whether or not the set condition is the condition that the vehicle 12 is stopped and that the door is closed. In a case in which the set condition is the condition that the vehicle 12 is stopped and that the door is closed (step S206: YES), the CPU 20A transitions to step S207. On the other hand, in a case in which the set condition is the condition that the vehicle 12 is stopped and that the door is open (step S206: NO), the CPU 20A transitions to step S209.

At step S207, the CPU 20A determines whether or not the door closest to the set occupant is closed. More specifically, at step S207, the CPU 20A determines whether or not a signal indicating that the door closest to the set occupant is closed has been received from the body ECU 30 as the opening/closing signal. In a case in which the door closest to the set occupant is closed (step S207: YES), the CPU 20A transitions to step S208. On the other hand, in a case in which the door closest to the set occupant is open (step S207: NO), the CPU 20A transitions to step S210.

At step S208, the CPU 20A provides notification of the distance by the notification method. More specifically, in a case in which the notification method is the display notification method, the CPU 20A displays a notification screen at the meter display 41. On the other hand, in a case in which the notification method is the voice notification method, the CPU 20A provides notification of the distance by voice via the speaker 42. It should be noted that, in a case in which the set condition is the condition that the vehicle 12 is stopped and that the door is open and in which the notification method is the voice notification method, the CPU 20A provides notification of the distance at a larger volume as the distance becomes shorter.

Figure 5:
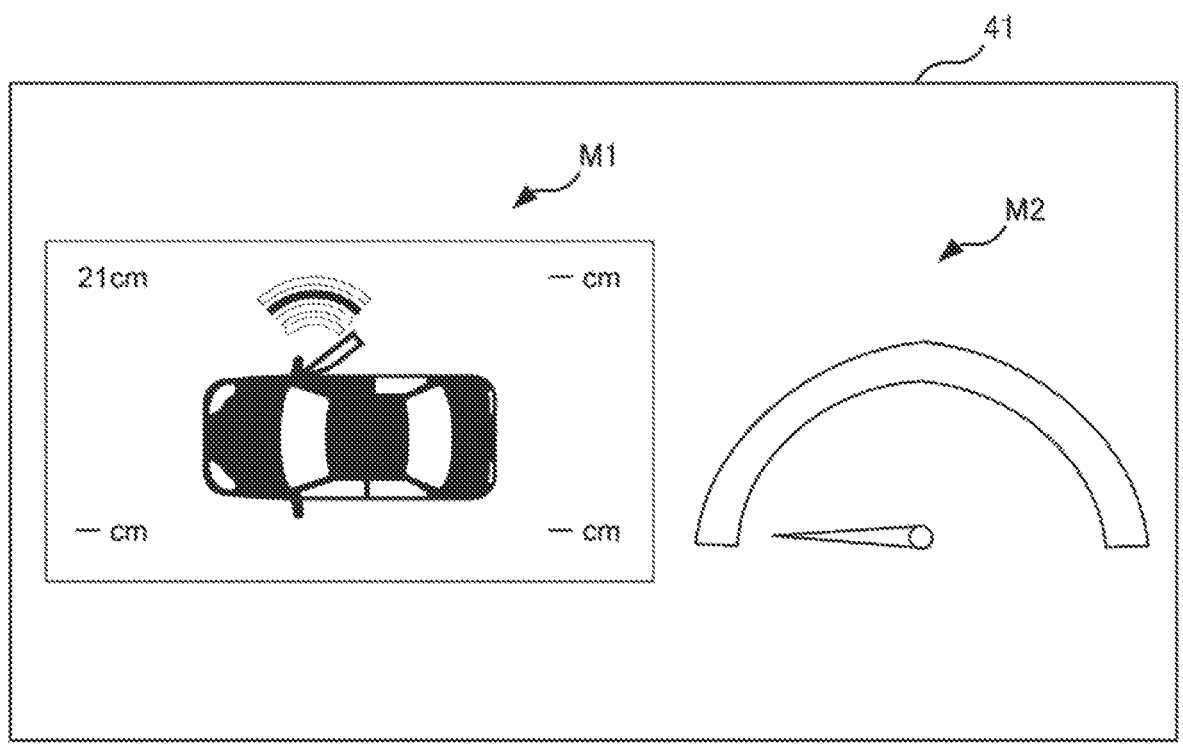
FIG. 5 is a schematic diagram illustrating an example of a notification screen according to the exemplary embodiment.

As illustrated in FIG. 5, in the notification screen, an icon M1 indicating the distance for each door and a meter M2 indicating the vehicle speed or the like are displayed. The numerical values illustrated at the four corners of the icon M1 correspond to distances between the respective doors of the vehicle icon and the obstacle. In the example illustrated in FIG. 5, the distance between the right front door of the vehicle 12 and the obstacle is 21 cm, and the other doors are closed.

At step S209, the CPU 20A determines whether or not the door closest to the set occupant is open. More specifically, at step S209, the CPU 20A determines whether or not a signal indicating that the door closest to the set occupant is open has been received from the body ECU 30 as the opening/closing signal. In a case in which the door closest to the set occupant is open (step S209: YES), the CPU 20A transitions to step S208. On the other hand, in a case in which the door closest to the set occupant is closed (step S209: NO), the CPU 20A transitions to step S210.

At step S210, the CPU 20A determines whether or not there is a door for which the distance between the door and the obstacle is equal to or less than the reference threshold value. In a case in which there is a door for which the distance between the door and the obstacle is equal to or less than the reference threshold value (step S210: YES), the CPU 20A transitions to step S211. On the other hand, in a case in which there is no door for which the distance between the door and the obstacle is equal to or less than the reference threshold value (step S210: NO), the CPU 20A ends the present notification processing.

At step S211, the CPU 20A determines whether or not the set condition is the condition that the vehicle 12 is stopped and that the door is closed. In a case in which the set condition is the condition that the vehicle 12 is stopped and that the door is closed (step S211: YES), the CPU 20A transitions to step S212. On the other hand, in a case in which the set condition is the condition that the vehicle 12 is stopped and that the door is open (step S211: NO), the CPU 20A transitions to step S214.

At step S212, the CPU 20A determines whether or not the door for which the distance is equal to or less than the reference threshold value is closed. More specifically, at step S212, the CPU 20A determines whether or not a signal indicating that the door for which the distance is equal to or less than the reference threshold value is closed has been received from the body ECU 30 as the opening/closing signal. In a case in which the door for which the distance is equal to or less than the reference threshold value is closed (step S212: YES), the CPU 20A transitions to step S213. On the other hand, in a case in which the door for which the distance is equal to or less than the reference threshold value is open (step S212: NO), the CPU 20A ends the present notification processing.

At step S213, the CPU 20A provides notification of the distance by the notification method. More specifically, in a case in which the notification method is the display notification method, the CPU 20A displays the notification screen at the meter display 41. On the other hand, in a case in which the notification method is the voice notification method, the CPU 20A provides notification of the distance by voice via the speaker 42. It should be noted that in a case in which the set condition is the condition that the vehicle 12 is stopped and that the door is open and in which the notification method is the voice notification method, the CPU 20A provides notification of the distance at a larger volume as the distance becomes shorter.

At step S214, the CPU 20A determines whether or not the door for which the distance is equal to or less than the reference threshold value is open. More specifically, at step S214, the CPU 20A determines whether or not a signal indicating that the door for which the distance is equal to or less than the reference threshold value is open has been received from the body ECU 30 as the opening/closing signal. In a case in which the door for which the distance is equal to or less than the reference threshold value is open (step S214: YES), the CPU 20A transitions to step S213. On the other hand, in a case in which the door for which the distance is equal to or less than the reference threshold value is closed (step S214: NO), the CPU 20A ends the present notification processing.

Notes

It should be noted that, in the above-described exemplary embodiment, the central ECU, which is included in the vehicle 12, is applied as the notification device. However, there is no limitation to this example. A device that is configured separately from the vehicle 12 may be applied as the notification device.

Further, the processing executed by the CPU reading and executing software (a program) in the above-described exemplary embodiment may be executed by various types of processors other than a CPU. Such processors include programmable logic devices (PLD) that allow circuit configuration to be modified post-manufacture, such as a field-programmable gate array (FPGA) or the like, and dedicated electric circuits, which are processors including a circuit configuration that has been custom-designed to execute specific processing, such as an application specific integrated circuit (ASIC) or the like. Further, the processing described above may be executed by any one of these various types of processors, or may be executed by a combination of two or more of the same type or different types of processors (such as, for example, plural FPGAs, a combination of a CPU and an FPGA, or the like). Furthermore, the hardware structure of these various types of processors is, more specifically, an electric circuit combining circuit elements such as semiconductor elements or the like.

Further, although explanation has been given regarding an aspect in which the respective programs are stored (installed) in advance in the ROM in the above-described exemplary embodiment, there is no limitation thereto. The programs may be provided in a format stored on a non-transitory storage medium such as a compact disc read only memory (CD-ROM), a digital versatile disc read only memory (DVD-ROM), a universal serial bus (USB) memory or the like. Alternatively, the programs may be provided in a format that is downloadable from an external device via a network.

The flow of the processing explained in the above-described exemplary embodiment is also an example, and unnecessary steps may be excluded, new steps may be added, or the processing order may be rearranged, within a range that does not depart from the gist of the present disclosure.

In addition, the respective configurations of the vehicle 12 and the central ECU 20 explained in the above-described exemplary embodiment are examples, and may be modified according to circumstances, within a range that does not depart from the gist of the present disclosure.

What is claimed is:

1. A notification device comprising:
a memory; and
a processor coupled to the memory,
the processor being configured to:
acquire a distance between a door provided at a vehicle and an obstacle facing the door,
acquire a seating position of a plurality of occupants of the vehicle,
receive a reference threshold value determined in advance by one occupant of the plurality of occupants, a set occupant that is determined in advance by the one occupant and that is another occupant to which the one occupant should warn, a condition determined in advance by the one occupant and related to the distance, and a method determined in advance by the one occupant, and
in a case in which the distance is equal to or less than the reference threshold value, and the condition is satisfied based on a distance between a door closest to the set occupant derived from the seating position of the set occupant and an obstacle facing the door closest to the set occupant, provide notification of the distance to the one occupant by the method.

2. The notification device according to claim 1, wherein the processor is configured to provide notification of the distance in a case in which the vehicle is stopped and the door is closed.

3. The notification device according to claim 1, wherein the processor is configured to provide notification of the distance at a larger volume as the distance becomes shorter, in a case in which the vehicle is stopped and the door is open.

4. The notification device according to claim 1, wherein the processor is configured to:
change the reference threshold value according to the seating position of the set occupant.

5. The notification device according to claim 1, wherein the processor is configured to perform control so as to disable opening or closing of the door, in a case in which the distance is equal to or less than a restriction threshold value that is less than the reference threshold value.

6. A notification method comprising performing processing by a processor, the processing comprising:
acquiring a distance between a door provided at a vehicle and an obstacle facing the door;
acquiring a seating position of a plurality of occupants of the vehicle;
receiving a reference threshold value determined in advance by one occupant of the plurality of occupants, a set occupant that is determined in advance by the one occupant and that is another occupant to which the one occupant should warn, a condition determined in advance by the one occupant and related to the distance, and a method determined in advance by the one occupant; and
in a case in which the distance is equal to or less than the reference threshold value, and the condition is satisfied based on a distance between a door closest to the set occupant deriving from the seating position of the set occupant and an obstacle facing the door closest to the set occupant, providing notification of the distance to the one occupant by the method.

7. A non-transitory storage medium storing a notification processing program executable by a processor to perform processing, the processing comprising:
acquiring a distance between a door provided at a vehicle and an obstacle facing the door;
acquiring a seating position of a plurality of occupants of the vehicle;
receiving a reference threshold value determined in advance by one occupant of the plurality of occupants, a set occupant that is determined in advance by the one occupant and that is another occupant to which the one occupant should warn, a condition determined in advance by the one occupant and related to the distance, and a method determined in advance by the one occupant; and
in a case in which the distance is equal to or less than the reference threshold value, and the condition is satisfied based on a distance between a door closest to the set occupant deriving from the seating position of the set occupant and an obstacle facing the door closest to the set occupant, providing notification of the distance to the one occupant by the method.

\* \* \* \* \*